(12) United States Patent
Branson et al.

(10) Patent No.: US 9,430,117 B2
(45) Date of Patent: Aug. 30, 2016

(54) TRIGGERING WINDOW CONDITIONS USING EXCEPTION HANDLING

(75) Inventors: Michael J. Branson, Rochester, MN (US); John M. Santosuosso, Rochester, MN (US); Brandon W. Schulz, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 990 days.

(21) Appl. No.: 13/347,974

(22) Filed: Jan. 11, 2012

(65) Prior Publication Data

US 2013/0179586 A1 Jul. 11, 2013

(51) Int. Cl.
| | |
|---|---|
| *G06F 15/16* | (2006.01) |
| *G06F 7/00* | (2006.01) |
| *G09G 5/00* | (2006.01) |
| *G06F 3/0481* | (2013.01) |
| *G06F 5/06* | (2006.01) |
| *G06F 15/163* | (2006.01) |

(Continued)

(52) U.S. Cl.
CPC ............. *G06F 3/0481* (2013.01); *G06F 5/06* (2013.01); *G06F 9/44* (2013.01); *G06F 15/163* (2013.01); *G06F 17/30* (2013.01); *H04N 21/435* (2013.01)

(58) Field of Classification Search
CPC ............. G06Q 40/00; H04L 12/2602; H04L 41/0803; H04L 1/187; H04L 65/608; H04N 21/435; H04N 21/437; H04N 21/438; H04N 21/462; G06F 2209/5022
USPC .......................................... 717/156; 709/231
See application file for complete search history.

(56) References Cited

U.S. PATENT DOCUMENTS 5,706,643 A * 1/1998 Snyder et al. .................. 60/776
5,764,651 A     6/1998 Bullock et al.
(Continued)

FOREIGN PATENT DOCUMENTS

| CN | 101098306 A | 1/2008 |
| CN | 102014031 A | 4/2011 |
| WO | 2011114548 A1 | 9/2011 |

OTHER PUBLICATIONS

IBM, Window Handling, Steams Applications, 2011, International Business Machines Corporation, Armonk, New York, United States, <http://publib.boulder.ibm.com/infocenter/streams/v2r0/index.jsp?topic=%2Fcom.ibm.swg.im.infosphere.streams.spl-toolkit-development-reference.doc%2Fdoc%2Fwindowhandling.html>.

(Continued)

*Primary Examiner* — Krista Zele
*Assistant Examiner* — Margishi Desai
(74) *Attorney, Agent, or Firm* — Patterson + Sheridan, LLP

(57) ABSTRACT

In a stream computing application, data may be transmitted between operators using tuples. However, the receiving operator may not evaluate these tuples as they arrive but instead wait to evaluate a group of tuples—i.e., a window. A window is typically triggered when a buffer associated with the receiving operator reaches a maximum window size or when a predetermined time period has expired. Additionally, a window may be triggered by a monitoring a tuple rate—i.e., the rate at which the operator receives the tuples. If the tuple rate exceeds or falls below a threshold, a window may be triggered. Further, the number of exceptions, or the rate at which an operator throws exceptions, may be monitored. If either of these parameters satisfies a threshold, a window may be triggered, thereby instructing an operator to evaluate the tuples contained within the window.

17 Claims, 6 Drawing Sheets

(51) Int. Cl.
   *G06F 9/44*      (2006.01)
   *G06F 17/30*     (2006.01)
   *H04N 21/435*    (2011.01)

(56) References Cited

U.S. PATENT DOCUMENTS

| | | |
|---|---|---|
| 6,189,065 B1 | 2/2001 | Arndt et al. |
| 6,678,672 B1 * | 1/2004 | Ramasamy et al. |
| 6,714,883 B1 | 3/2004 | Samuels |
| 6,792,564 B2 * | 9/2004 | Ahrens et al. ............... 714/45 |
| 7,437,397 B1 | 10/2008 | Koudas et al. |
| 7,644,110 B2 | 1/2010 | Nishizawa et al. |
| 7,849,227 B2 | 12/2010 | Kashiyama et al. |
| 8,191,136 B2 | 5/2012 | Dudfield et al. |
| 2002/0138640 A1 * | 9/2002 | Raz et al. .................. 709/231 |
| 2003/0149717 A1 | 8/2003 | Heinzman |
| 2004/0176921 A1 | 9/2004 | Lacy et al. |
| 2004/0260474 A1 * | 12/2004 | Malin et al. .................. 702/6 |
| 2005/0015455 A1 | 1/2005 | Liu |
| 2005/0071752 A1 * | 3/2005 | Marlatt ..................... 715/506 |
| 2005/0102325 A1 * | 5/2005 | Gould et al. ............ 707/104.1 |
| 2005/0114369 A1 * | 5/2005 | Gould et al. ............... 707/100 |
| 2006/0282534 A1 * | 12/2006 | Berg ......................... 709/225 |
| 2007/0288635 A1 | 12/2007 | Gu et al. |
| 2008/0005391 A1 | 1/2008 | Gedik et al. |
| 2009/0125660 A1 | 5/2009 | Nemirovsky et al. |
| 2009/0307352 A1 * | 12/2009 | Felton et al. ............... 709/226 |
| 2009/0307353 A1 * | 12/2009 | Felton et al. ............... 709/226 |
| 2009/0313614 A1 * | 12/2009 | Andrade et al. ............ 717/151 |
| 2010/0106946 A1 | 4/2010 | Imaki et al. |
| 2010/0138438 A1 | 6/2010 | Torikai et al. |
| 2010/0262661 A1 * | 10/2010 | McColgan et al. ......... 709/206 |
| 2010/0293535 A1 | 11/2010 | Andrade et al. |
| 2010/0325621 A1 * | 12/2010 | Andrade et al. ............ 717/156 |
| 2011/0010359 A1 | 1/2011 | Burger |
| 2011/0016160 A1 | 1/2011 | Zhang et al. |
| 2011/0016469 A1 | 1/2011 | Klein |
| 2011/0072475 A1 | 3/2011 | McKiel, Jr. |
| 2011/0158107 A1 * | 6/2011 | Cao et al. .................... 370/242 |
| 2011/0239048 A1 | 9/2011 | Andrade et al. |
| 2011/0255404 A1 * | 10/2011 | Kafka ............... H04L 41/0896 370/232 |
| 2012/0002733 A1 | 1/2012 | Misra et al. |
| 2012/0137164 A1 | 5/2012 | Uhlig et al. |
| 2013/0179585 A1 | 7/2013 | Branson et al. |

OTHER PUBLICATIONS

U.S. Patent Application entitled "Triggering Window Conditions by Streaming Features of an Operator Graph", filed Jan. 11, 2012.
International Search Report and Written Opinion of the ISA dated May 23, 2013—International Application No. PCT/IB2012/057379.

* cited by examiner

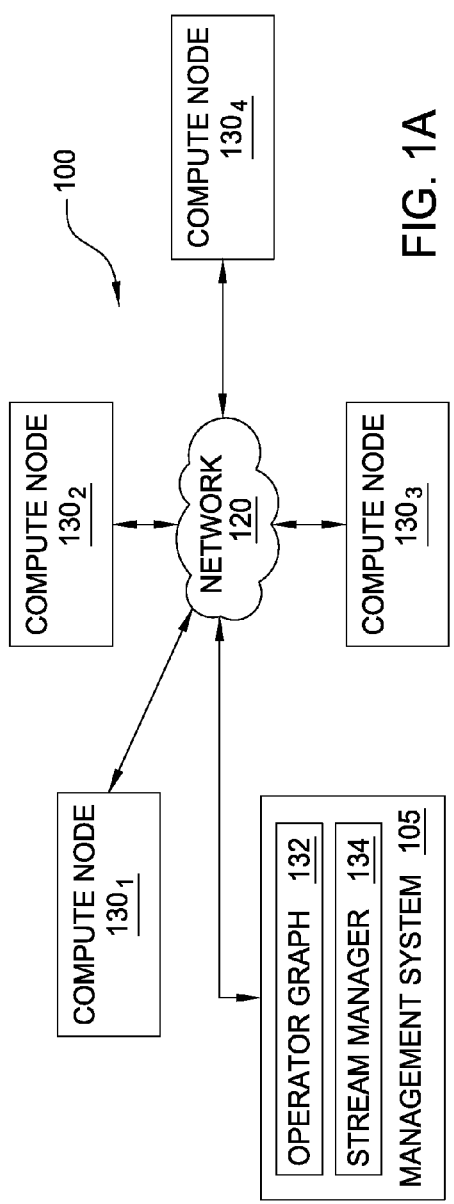
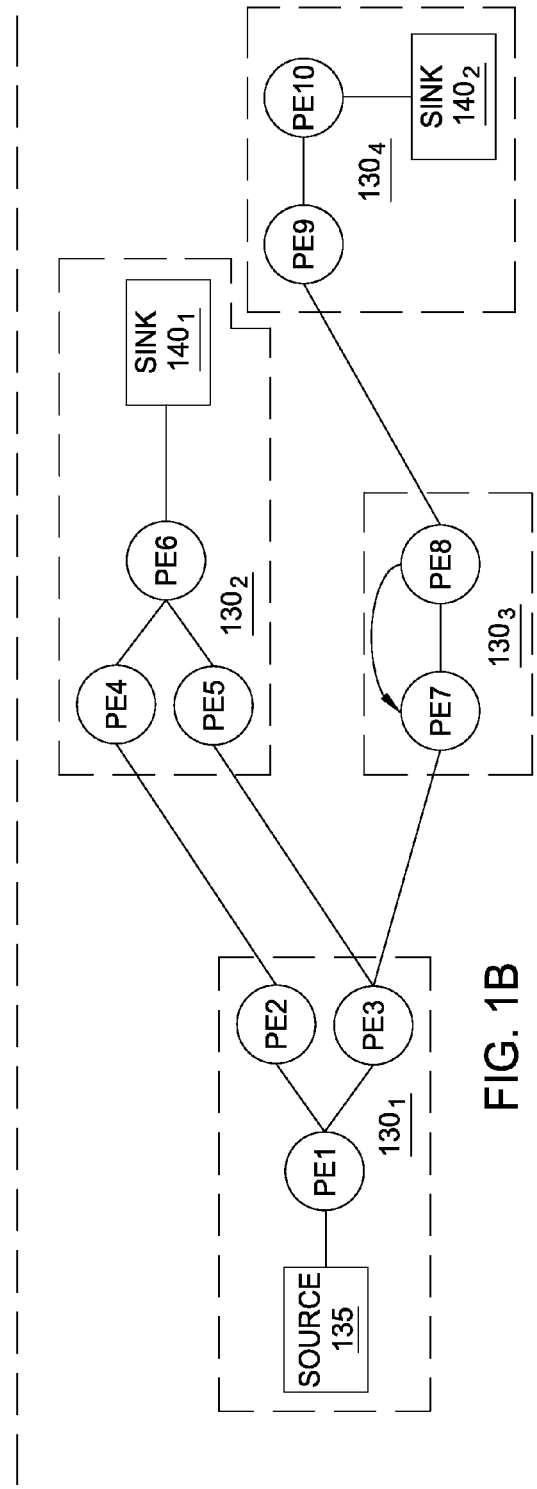
FIG. 1A
FIG. 1B

TRIGGERING WINDOW CONDITIONS USING EXCEPTION HANDLING

BACKGROUND

1. Field of the Invention

Embodiments of the present invention generally relate to stream computing applications. Specifically, the invention relates to using different stream metrics to trigger windows of tuples that are processed by operators in a stream computing application.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provide a method, system and computer program product for processing data.

In one embodiment, the method and computer program receive streaming data tuples to be processed by a plurality of operators, the operators processing at least a portion of the received data tuples. The method and computer program also establish an operator graph of the plurality of operators where the operator graph defines at least one execution path and where a first operator of the plurality of operators is configured to receive data tuples from at least one upstream operator and transmit data tuples to at least one downstream operator. The method and computer program determines a current number of exceptions occurring while the upstream operator performs an operation based on at least one of the streaming data tuples. The method and computer program trigger a data window in at least one operator of the plurality of operators different from the upstream operator based on the number of exceptions where the window comprises a plurality of data tuples.

In another embodiment, the system the system comprises at least two compute nodes, each compute node comprising at least one computer processor. The at least two compute nodes are configured to host at least one of a plurality of operators that process streaming data tuples. Moreover, the operators process at least a portion of the received data tuples. The plurality of operators establish an operator graph which defines at least one execution path in which a first operator of the plurality of operators is configured to receive data tuples from at least one upstream operator and transmit data tuples to at least one downstream operator. The system also includes a window activator that is configured to determine a current number of exceptions occurring while the upstream operator performs an operation based on at least one of the streaming data tuples and trigger a data window in at least one operator of the plurality of operators different from the upstream operator based on the number of exceptions where the data window comprising a plurality of data tuples.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure configured to execute a stream computing application, according to embodiments of the invention.

DETAILED DESCRIPTION

Figure 2:
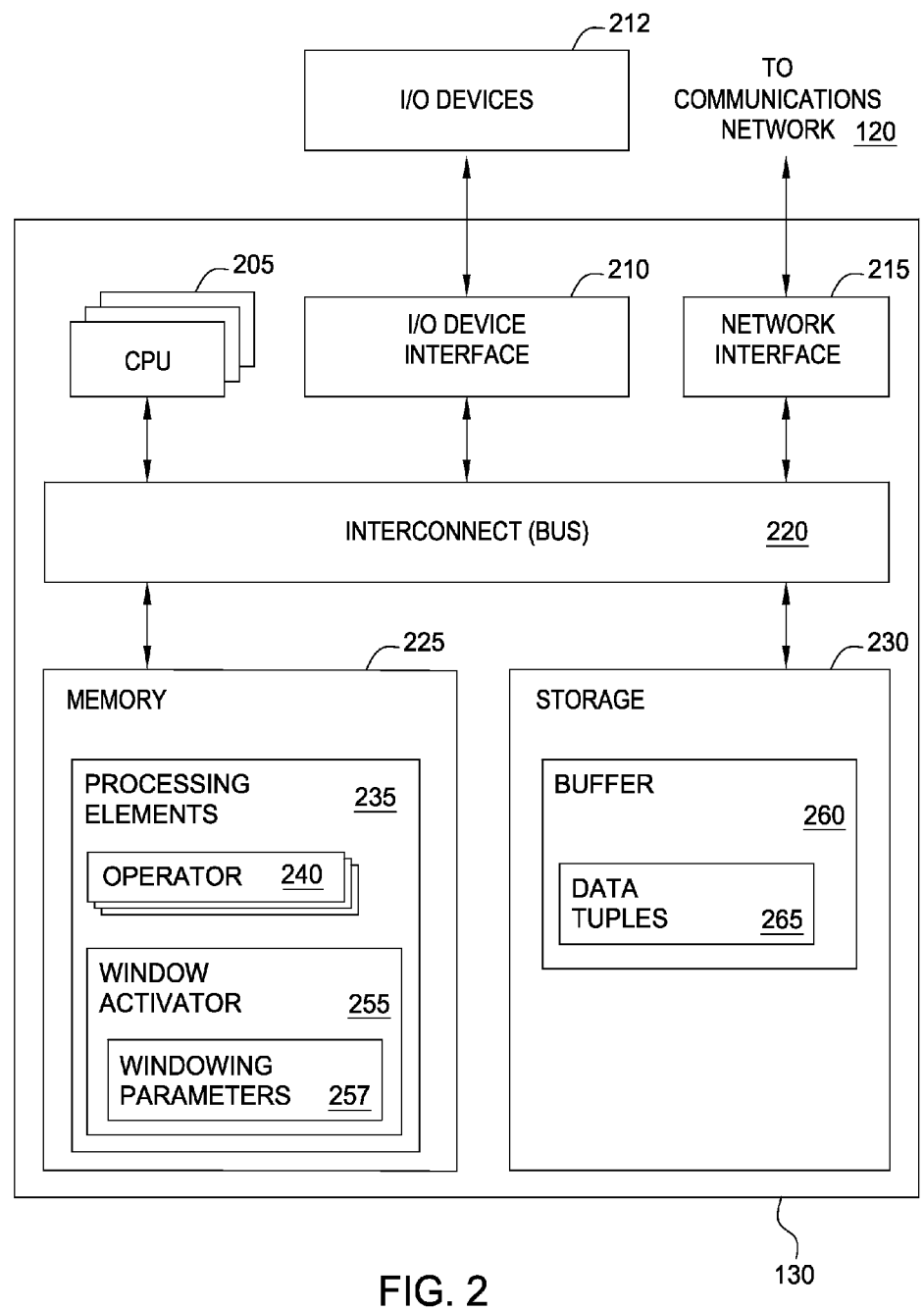
FIG. 2 is a more detailed view of the compute node of FIGS. 1A-1B, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, processing elements are connected to one another such that data flows from one processing element to the next (e.g., over a TCP/IP socket). Scalability is reached by distributing an application across nodes by creating many small executable pieces of code (i.e., operators), as well as replicating processing elements on multiple nodes and load balancing among them. Processing elements (and operators) in a stream computing application can be fused together to form a larger processing element or a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application, as well as fused or un-fused from a stream computing application during runtime.

Moreover, some stream computing applications stream data between operators (or processing elements) using tuples. The operators may then perform one or more processing functions using the received tuples. Instead of processing the tuples as they are received, the operator may wait to evaluate a group of tuples—i.e., a window. The stream computing application, however, needs an indicator for determining when to trigger a window which instructs the operator to evaluate the tuples included within the data window. Possible windowing parameters include waiting until a certain amount of tuples are received or waiting until a certain amount of time has passed.

Instead of relying solely on these two parameters, a window may be triggered based on the rate at which an operator receives the tuples—i.e., a ratio of the number of tuples received within a period of time. If the rate exceeds or falls below a threshold, a data window may be triggered. For example, if an operator triggers a window after it receives a 1000 tuples, but the rate at which it receives tuples falls below 10 tuples per second, the operator may trigger a window even if it has received only 500 tuples. Additionally, the stream computing application may evaluate past tuple rates to determine how much the current tuple rate deviates from the historical rate. If the deviation—e.g., a percentage that compares the historical rate to the current rate—exceeds or falls below a threshold, a window may be triggered.

If multiple operators transmit tuples to a single operator, the tuple rate for each of the data paths may be monitored and considered. The stream computing application may, for example, ensure that all of the tuple rates flowing into the operator exceed respective thresholds before triggering a window.

In addition to, or in place of, evaluating the tuple rates, the stream computing application may monitor the number of exceptions thrown by one or more operators. As part of the exception handling performed by an individual operator, the operator may record the total number of exceptions or the exceptions of a particular type to determine if it exceeds or falls below a threshold. If so, a data window may be triggered.

Regardless whether the stream computing application uses tuple rates or exceptions to trigger a window, the window may be triggered in an operator that is not downstream of the operator that provides the tuple rate or the exception count. That is, these parameters may be used to trigger a window on any operator in the operator graph of the stream computing application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). In general, a "tuple" is a single instance of a set of data attributes that follow the formatting of a schema, where the schema establishes a set of typed data attributes that may be used. For example, the tuple may be a chunk or portion of divisible data such as a data type (e.g., string, int, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by a processing element need not be the same N-tuple sent downstream. Additionally, PEs could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements) running on the compute nodes $130_{1-4}$. One example of a stream computing application is IBM®'s InfoSphere® (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the operator graph begins at a source 135 (that flows into the processing element labeled PE1) and ends at sink $140_{1\text{-}2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of executable code configured to evaluate data flowing into a processing element (e.g., PE 235) and to emit data to other operators 240 in that PE or to other PEs in the stream computing application. Such processing elements may be on the same compute node 130 or on other compute nodes accessible over the communications network 120.

The PE 235 also includes a window activator 255 (a software module, hardware module or a combination of both) which may use windowing parameters 257 to determine whether to trigger a data window for one or more of the operators 240 in the PE 235. In other embodiments, the window activator 255 may be independent of the PE 235 and may execute in memory 225 or as a hardware unit in the compute node 130. As used herein, a "window" includes a plurality of tuples (i.e., a plurality of chunks of divisible data that are processed by the operators 240). In one embodiment, an operator 240 may only evaluate received tuples after a window is triggered, and even then, the operator 240 processes only the tuples contained within the window. The windowing parameters 257 may include, for example, a predefined number of tuples in a window, a predefined period of time, a threshold for evaluating the tuple rate, a predefined number of exceptions, a threshold for evaluating an exception rate, and any combination thereof. The window activator 255 may, for example, monitor the rate at which an operator 240 receives tuples from a different operator 240. If the rate falls below or exceeds a threshold defined by the windowing parameters 257, the window activator 255 may trigger a window.

As shown, storage 230 contains a buffer 260 which stores data tuples 265. The buffer 260 represents a storage space for data tuples 265 that flow into the compute node 130 from upstream operators, operators in the same processing element, or from a data source for the stream computing application. Although shown as being in storage, the buffer 260 may located in the memory 225 of the compute node 130 or a combination of both. Moreover, storage 230 may include storage space that is external to the compute node 130.

Figure 3:
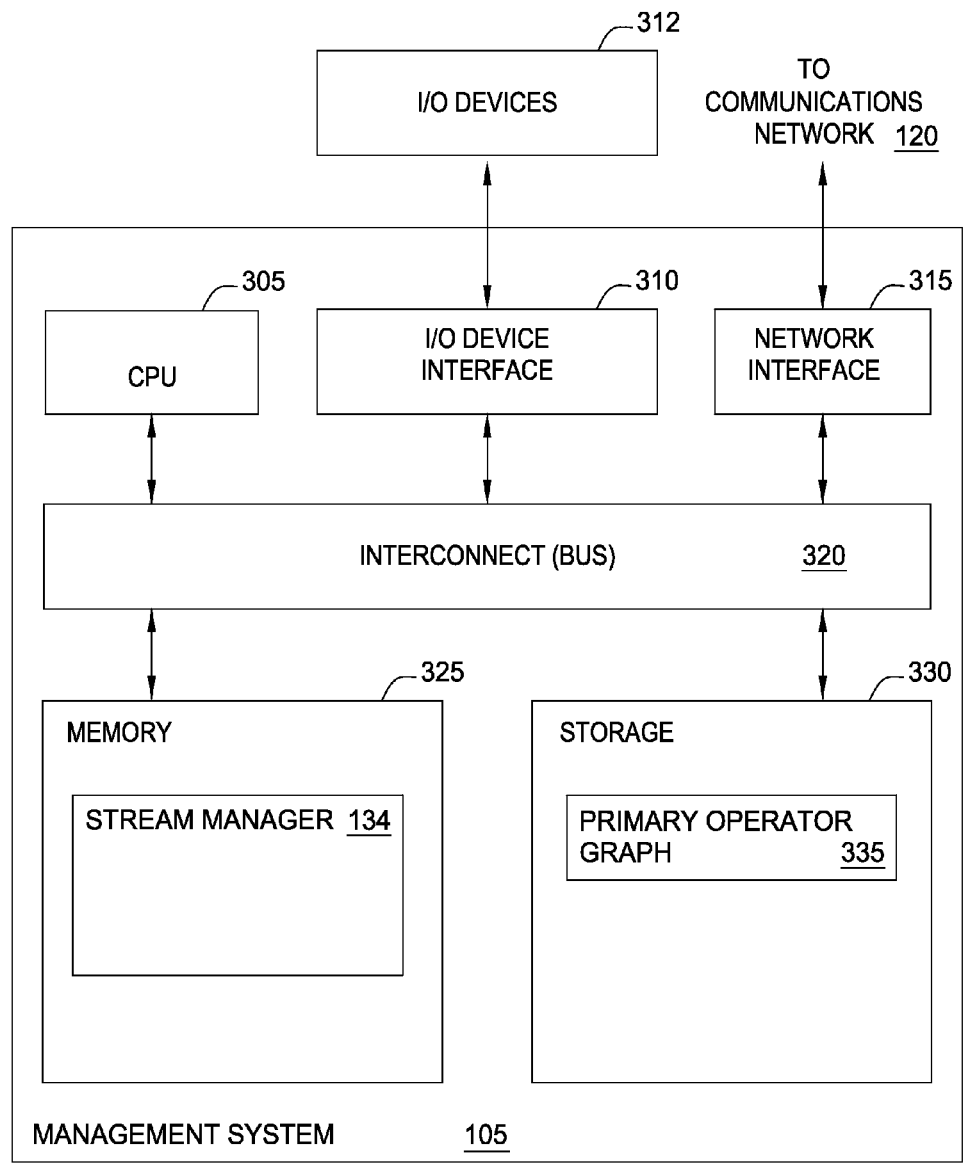
FIG. 3 is a more detailed view of the server management system of FIGS. 1A-1B, according to one embodiment of the invention.

FIG. 3 is a more detailed view of the server management system 105 of FIG. 1, according to one embodiment of the invention. As shown, server management system 105 includes, without limitation, a CPU 305, a network interface 315, an interconnect 320, a memory 325, and storage 330. The server management system 105 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 315, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing.

Figure 4:
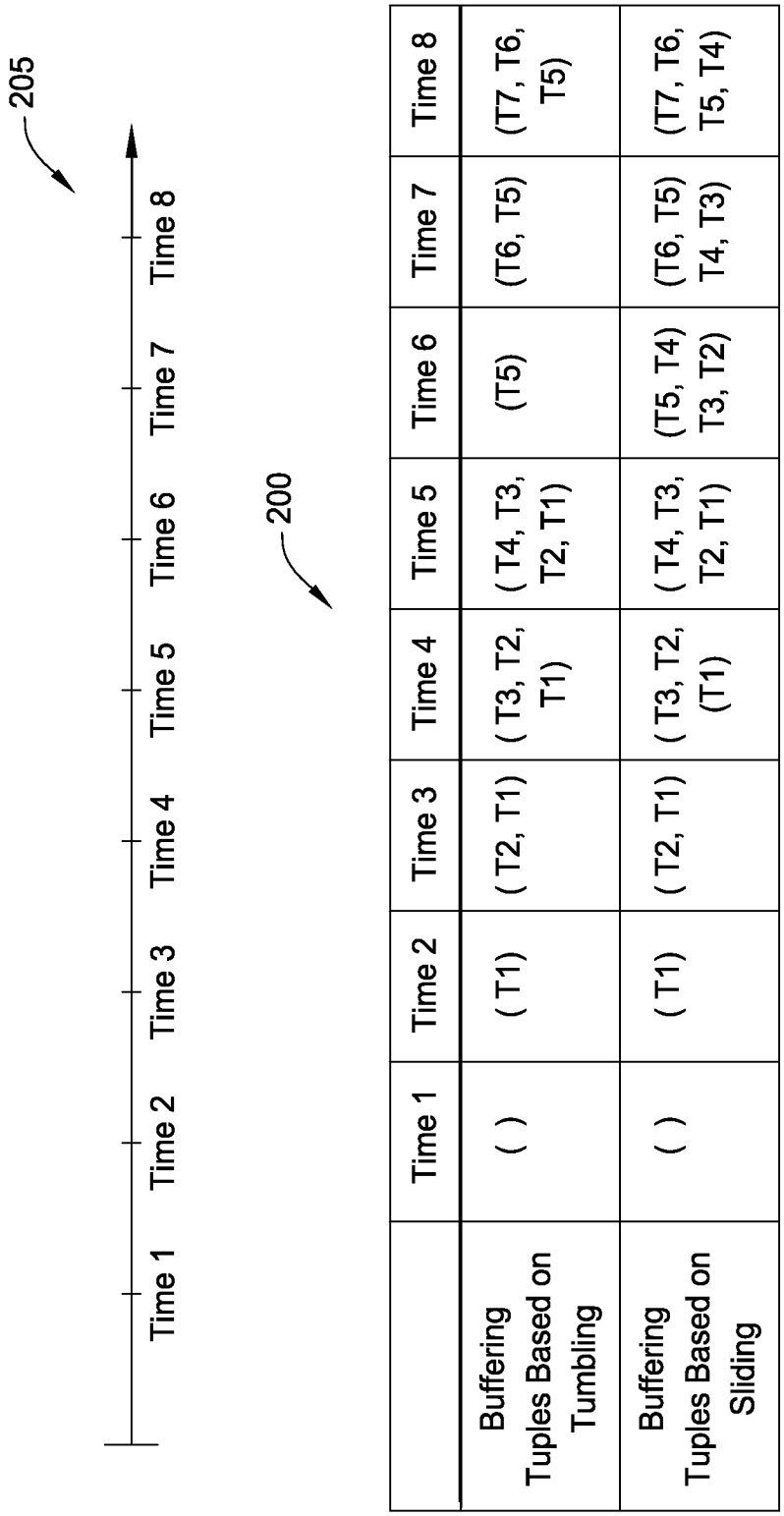
FIG. 4 is a table illustrating tumbling and sliding windows in a stream computing application, according to one embodiment of the invention.

FIG. 4 is a table illustrating tumbling and sliding windows in a stream computing application, according to one embodiment of the invention. The window activator 255 may manage data windows in two primary ways though this invention is not limited to these two methods. The first primary way is tumbling while the second is sliding. A tumbling window includes a one or more tuples (i.e., a chunk of divisible data) that after being processed by an operator 240 are discarded. In contrast, a sliding window may include tuples that were processed in a previously triggered sliding window. FIG. 4 illustrates the difference between these two window types.

Timeline 205 illustrates Time 1-8 where an operator 240 receives one tuple (i.e., one of T1-T7) from an upstream operator. The two rows in Table 200 illustrate the results of storing the same tuples in a buffer 260 using the two different window schemas.

Assume at Time 1 that the buffer 260 is empty, but at Time 2-5, the operator 240 receives T1-T4 which are stored in the buffer 260. In one embodiment, the windowing parameters 257 associated with the operator instructs the window activator 255 to trigger a window once the buffer 260 reaches a size of four tuples. Alternatively, assuming that the time periods of the timeline 205 represent equal periods of time, the windowing parameters 257 may establish that a window is triggering after four time periods have elapsed. Using either parameter, at time 5, the window activator 255 determines that the parameter is satisfied and triggers a window.

After the window is triggered and the operator 240 evaluates the tuples within the window, the tuples within a tumbling window are discarded. Accordingly, at Time 6 the buffer 260 expels T1-T4 and only contains newly received T5.

For a new window to be triggered, the window activator 255 waits until the buffer 260 again contains the requisite number of tuples or until the predefined period of time has expired. In table 200, the window activator 255 triggers a new window once T8 is received or Time 9 arrives. In either case, the buffer 260 that implements tumbling windows would once again expel the tuples associated with the new window (i.e., T5-T8).

In contrast, a sliding window technique may require the buffer 260 to keep some of the old tuples from the previous window. Like with tumbling windows, a sliding window may trigger initially based on whether the requisite number of tuples are received or if the predefined period of time has expired. In Table 200, the windowing parameters 257 further require the window activator 255 to trigger a new window at each time period following the time period when the initial window was triggered, or alternatively, trigger a new window each time a new tuple is received. For example, if a stream application wants a four minute moving average of a stock ticker that is sampled every minute, the window activator 255 waits four minutes (e.g., Time 2-5) until four minutes worth of data arrives at the buffer (e.g., T1-T4) and then triggers a new window each time a new tuple is received or another minute passes. Accordingly, at Time 6, the window activator 255 triggers a new window containing T2-T5, at Time 7, the window activator 255 triggers a new window containing T3-T6, etc. Note that with this windowing schema, the buffer 260 may expel one or more of the tuples from the previous window, but unlike tumbling windows, one of the tuples in the previous window may still be included in a new window.

Although not shown in Table 200, the window activator 255 may wait for multiple time periods to pass, or multiple tuples to be received, before triggering a new sliding window. For example, the window activator 255 may wait four time periods before triggering the first window but triggers a new sliding window every two time periods thereafter. In this case, a second window is triggered at Time 7 and would contain (T6, T5, T4, T3)—i.e., the buffer 260 expelled both T1 and T2. Here, only T4 and T3 are contained in both the first and second windows because a sliding window is capped at a maximum size of four tuples.

Using Tuple Rate or Exceptions to Trigger Windows

Figure 5:
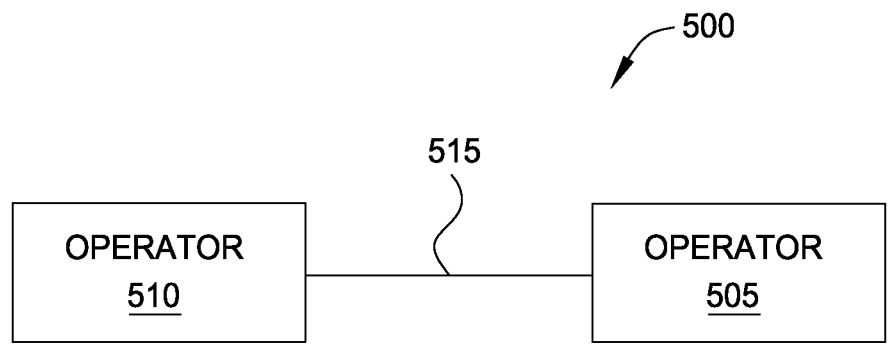
FIG. 5 illustrates a partial operator graph for triggering windows, according to one embodiment of the invention.

FIG. 5 illustrates a partial operator graph 500 for triggering windows, according to one embodiment of the invention. Instead of using only a time period or a total number of received tuples to trigger a window, the window activator 255 may consider the rate at which tuples are received, the number of exceptions being thrown, or the rate at which exceptions are thrown by a particular operator 240. A tuple rate is the ratio of received tuples according to a predefined time period (e.g., 10 tuples/second or 2 seconds/tuple). FIG. 5 illustrates a partial operator graph 500 with an execution path 515 between operator 505 and operator 510 where operator 510 transmits tuples to operator 505. The tuples may be transmitted either serially (i.e., one at a time) or in a group via the execution path 515. The window activator 255 associated with operator 505 may monitor the rate at which the tuples are received in the buffer 260 associated with operator 505.

In one embodiment, the windowing parameters 257 may include at least one predefined threshold for quantifying the measured tuple rate. A stream computing application may, for example, primarily transfer tuples between operators 505 and 510 at a slow rate but will occasionally have short bursts where the rate increases dramatically. Instead of waiting for the maximum number of tuples to be received, or for a predefined time period to pass, the window activator 255 may detect the burst (i.e., a rate above a threshold) and trigger a window. Alternatively, the window activator 255 may trigger a window if the measured rate falls below a threshold. That is, a slow rate may indicate an important event which requires the operator 505 to immediately begin processing the tuples within a window.

Exceptions may also be used as indicators of significant events that may require triggering a window. Exceptions and exception handling is well known by someone of ordinary skill in the art. Many computer languages, such as Actionscript, Ada, BlitzMax, C++, C#, D, ECMAScript, Eiffel, Java ML, Object Pascal (e.g. Delphi, Free Pascal, and the like), Objective-C, Ocaml, PHP (as of version 5) PL/1, Prolog, Python, REALbasic, Ruby, Visual Prolog and most .NET languages have built-in support for exceptions and exception handling. As mentioned previously, operators may provide a small chunk of executable code configured to process data flowing into a processing element. This executable code may be written in any present or future computer language that supports exceptions and exception handling.

In general, an exception is a special condition that changes the normal flow of program execution. Non-limiting examples of exceptions may include number format exceptions, null pointer exceptions, file not found exceptions, and the like. When the executable code associated with operator 510 throws an exception while processing tuples, the window activator 255 on either operator 510 or

505 may detect the exception and increment a count. The window activator 255 may have a separate count for each particular exception (e.g., null pointer exception count) or have a global count for two or more selected exceptions. The windowing parameters 257 may include a threshold for these different counts—i.e., once the count exceeds the threshold, the window is triggered. Specifically, if the code associated with operator 510 throws enough exceptions to exceed the threshold, then a window is triggered for operator 505. In one embodiment, exceptions may indicate that a there is a problem with the upstream operator 510 and that the downstream operator 505 should go ahead and evaluate the tuples it has received. In another embodiment, the window activator 255 may trigger a window if the exception count associated with operator 510 is below a certain threshold. For example, the window activator 255 may trigger a window if the exception count is below the threshold at a certain point in time or after a certain number of tuples have flowed through the operator.

In one embodiment, the window activator 255 may consider an exception rate. Similar to a tuple rate, the window activator 255 could compare the measured exception rate—i.e., a ratio of the number of exceptions within a period of time—to a threshold. If the exception rate of operator 510 exceeds or falls below one or more thresholds, the window activator 255 may trigger a window for operator 505.

Moreover, the window activator 255 may compare a tuples or execution rate to a plurality of thresholds. For example, if a rate exceeds a first threshold, a window is triggered, and if the rate falls below a second, lower threshold, a window is also triggered.

In one embodiment, the window activator 255 may compare a current tuple or exception rate to a historical rate. While the stream application is operating, the window activator 255 may constantly monitor the respective rates. Using this data, the window activator 255 can dynamically update a historical rate by, for example, averaging the historical data. The historical rate can be compared to the current rate. For example, the difference between the rates may be expressed as a percentage—e.g., the current rate is 50% of the historical rate. The windowing parameters 257 may store one or more thresholds associated with this difference. Thus, if the current rate exceeds or falls below the historical rate, a window may be triggered. This feature permits the stream application to determine a customized historical tuple rate for each execution path or a historical exception rate for each operator.

In one embodiment, the stream application may execute for a predetermined amount of time to allow the window activator 255 enough data points to develop a historical rate—e.g., an average rate. Once the historical rate is detected, the window activator 255 may compare the historical rate to a current rate to determine outliers—i.e., whether the current rate is too high or too low when compared to the historical rate. In either case, the window activator 255 may determine to trigger a window.

In another embodiment, the stream application may use data from a previous execution of the operator graph. That is, instead of executing the application for a predetermined amount of time to develop a historical rate, the window activator 255 may generate a historical rate using data from executing the same or similar stream application previously. In this manner, the window activator 255 may not execute the application for a predetermined amount of time before triggering windows using historical rates.

Figure 6:
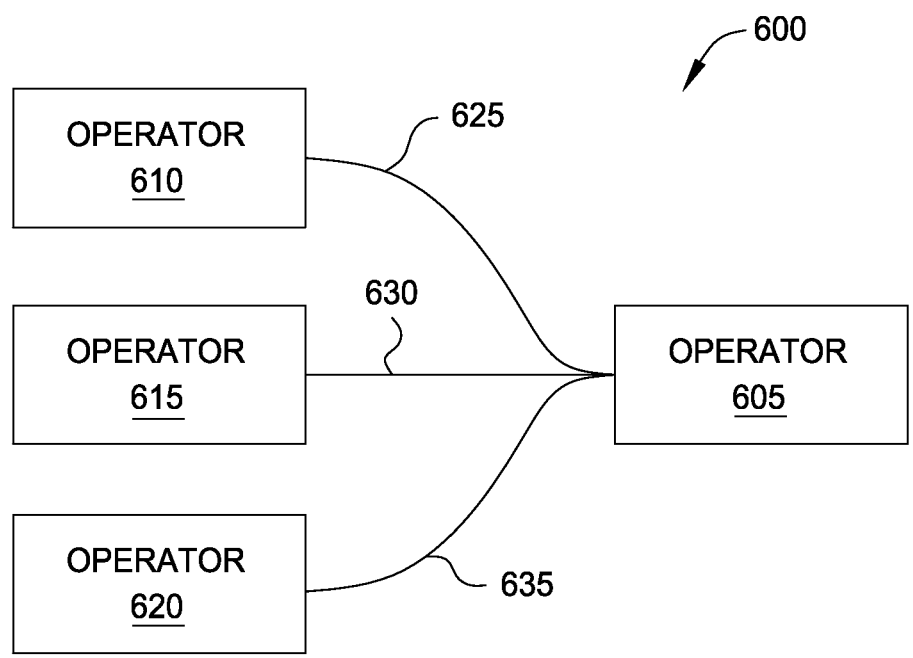
FIG. 6 illustrates a partial operator graph for triggering windows, according to one embodiment of the invention.

FIG. 6 illustrates a partial operator graph 600 for triggering windows, according to one embodiment of the invention. As shown, operators 610, 615, and 620 pass tuples to operator 605. The operators may be fused together into one PE, be located in two or more separate PEs, or be executed on different compute nodes.

In one embodiment, the window activator 255 for operator 605 may consider each of the tuple rates of the executions paths 625, 630, 635 before triggering a window. That is, at least two of the tuple rates must exceed at least one predetermined threshold before a window is triggered in operator 605. Alternatively, the window activator 255 may trigger a window if at least one of the tuple rates exceeds a first threshold while another of the tuple rates falls below a second threshold. One of ordinary skill will recognize the many different combinations that may be considered when comparing multiple tuple rates for triggering windows.

A similar process may be performed by monitoring exceptions in the operators 610, 615, and 620. The window activator 255 of operator 605 may monitor the number of exceptions thrown by at least two of the operators 610, 615, and 620. If, for example, operator 610 throws enough null pointer exceptions to satisfy a first threshold and operator 615 throws enough file not found exceptions to satisfy a second threshold, the window activator 255 may trigger a window for operator 605. Again, one of ordinary skill in the art will recognize the many different exceptions on at least two operators that may be considered when triggering a window on a different operator. Moreover, this process of considering multiple operators when triggering a single window may be used with exception rates as discussed in regards to FIG. 5.

Figure 7:
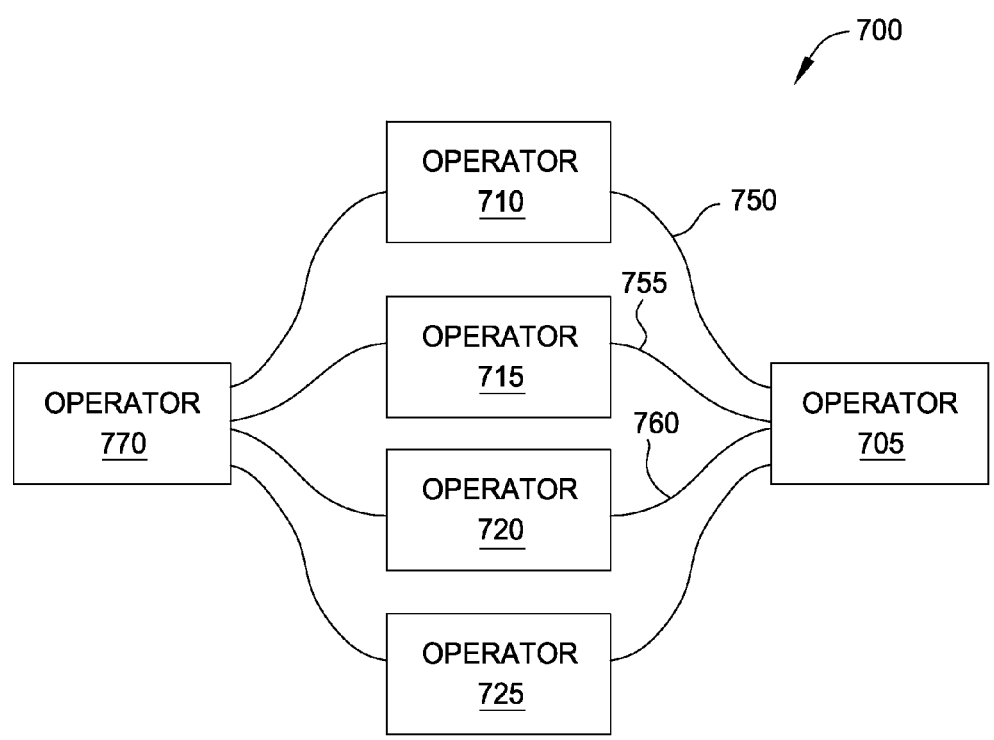
FIG. 7 illustrates a partial operator graph for triggering windows, according to one embodiment of the invention.

FIG. 7 illustrates a partial operator graph 700 for triggering windows, according to one embodiment of the invention. Specifically, FIG. 7 illustrates that tuple rates, the total number of exceptions thrown, or exception rates associated with a first operator may be used to trigger a window on a second operator that is not downstream of the first operator in the operator graph 700. Operators 710, 715, 720, and 725 receive tuples from operator 770. In turn, operators 710, 715, 720, and 725 process the tuples received from operator 770 and transmit these tuples to operator 705. However, a window activator 255 in one of the tuples may monitor the tuple rates, number of exceptions thrown, or exceptions rates associated with one or more of the operators 705, 710, 715, 720, 725, and 770 to trigger a window on any of the operators in the graph 700.

For example, assume that operator 770 passes tuples associated with a text file to operators 710, 715, 720, and 725. Once the tuples are received at operator 710, the operator 710 begins to parse the file looking for a certain text string—e.g., Text A—by processing the tuples. Similarly, operator 715 parses the text file looking for Text B and operator 720 parses the text file looking for Text C. Only if the operators 710, 715, and 720 find the respective texts do they transmit a tuple to operator 705. Operator 725, however, may not begin processing the text file once it is received. Instead, the application programmer may want operator 725 to execute (i.e., trigger a window that includes the tuples comprising the text file) only if operators 710, 715, and 720 find a small number of occurrences of Texts A, B, and C. Accordingly, the window activator 255 for operator 725 may monitor the tuple rates for execution paths 750, 755, and 760, and if each of the associated tuple rates fall below a predefined threshold, the window activator 255 triggers a window on operator 725 to process the text file using its additional analytics. In this manner, a tuple rate flowing from an operator may be used to trigger a window on an operator that is upstream, at the same level, or downstream of the operator that is being monitored.

Although this example discusses evaluating the tuple rates from multiple operators (i.e., operators 710, 715, 720), the window activator 255 of operator 725 may consider a subset of these rates or only one of the rates to trigger its window. For example, if the analytics performed by operator 725 further evaluate Text A, the window activator 255 may trigger a window for operator 725 if the tuple rate flowing from operator 710 exceeds a certain threshold irrespective of the tuples rates associated with the other operators.

Moreover, the example discussed previously may be performed by considering a total number of exceptions thrown by one or more of the operators 710, 715, 720 or the exception rate associated with the one or more operators 710, 715, 720. For example, if the analytics performed by operator 725 further evaluate Text B, the window activator 255 may trigger a window for operator 725 if the rate at which operator 715 throws a null pointer exception (i.e., the operator tasked with identifying Text B in the text file) falls below a certain threshold. That is, the stream application may be configured to use processing power and energy to execute the code associated with operator 725 only if operator 715 is able to execute without failing as indicated by the rate at which operator 715 throws exceptions.

In general, each of the functions described in FIGS. 5 and 6 may also be used in the embodiments discussed in regards to FIG. 7.

Moreover, the embodiments discussed in FIG. 5-7 may be used in both types of windowing schemes: tumbling windows and sliding windows. For example, instead of relying on the number of received tuples to trigger a window, the number of exceptions thrown by a particular operator may be monitored. Once the exception count hits a maximum, the window is triggered. Alternatively, the first tumbling window may be triggered by waiting until a time period lapses but the second tumbling window may be triggered by the exception rate.

With regards to sliding windows, the initial window could be triggered using a total number of received tuples or a period of time but the incremental shift when triggering subsequent windows may be triggered according to, for example, the tuple rate. That is, the typical parameters for triggering sliding and tumbling windows may be combined with the tuple rate, number of exceptions thrown, or the exception rate. Of course, tumbling and sliding windows may be triggered solely on the tuple rate, number of exceptions detected, or the exception rate.

CONCLUSION

In a stream computing application, data may be transmitted between operators using tuples. However, the receiving operator may not evaluate these tuples as they arrive but instead wait to evaluate a group of tuples—i.e., a window. A window is typically triggered when a buffer associated with the receiving operator reaches a maximum window size or when a predetermined time period has expired. Additionally, a window may be triggered by a monitoring a tuple rate—i.e., the rate at which the operator receives the tuples. If the tuple rate exceeds or falls below a threshold, a window may be triggered. Further, the number of exceptions, or the rate at which an operator throws exceptions, may be monitored. If either of these parameters satisfies a threshold, a window may be triggered, thereby instructing an operator to evaluate the tuples contained within the window.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing data, comprising:
   receiving streaming data tuples to be processed by a plurality of operators, the operators processing at least a portion of the received data tuples by operation of one or more computer processors;
   establishing an operator graph of the plurality of operators, the operator graph defining at least one execution path in which a first operator of the plurality of operators is configured to receive data tuples from at least one upstream operator and transmit data tuples to at least one downstream operator;
   determining a current number of exceptions occurring while the upstream operator performs an operation based on at least one of the streaming data tuples; and
   triggering a data window in at least one operator of the plurality of operators different from the upstream operator when the current number of exceptions satisfies a threshold, the data window comprising a plurality of data tuples, and wherein triggering the data window causes the at least one operator to evaluate the plurality of data tuples in the data window.

2. The method of claim 1 wherein the threshold is a predefined threshold.

3. The method of claim 1, further comprising:
   determining a historical number of exceptions that are thrown from the upstream operator;
   comparing the historical number of exceptions to the current number of exceptions to determine whether the threshold is met; and
   if the threshold is met, triggering the data window.

4. The method of claim 1, wherein at least two upstream operators throw exceptions, further comprising:
   measuring the current number of exceptions for each of the at least two upstream operators; and
   triggering the data window in the at least one operator based on the current number of exceptions for each of the at least two upstream operators.

5. The method of claim 4, wherein triggering the data window is further based on whether the current number of exceptions for each of the at least two upstream operators exceed or fall below one or more thresholds, the one or more thresholds are based on one of:
a predefined threshold, and
a difference between at least one historical current number of exceptions and the current number of exceptions for each of the at least two upstream operators.

6. The method of claim 1, wherein triggering the data window is based on an exception rate, the exception rate is a ratio of number of exceptions thrown by the upstream operator during a predefined period of time.

7. A computer program product for processing data, the computer program product comprising:
a computer-readable storage medium having computer-readable program code embodied therewith, the computer-readable program code comprising computer-readable program code configured to:
receive streaming data tuples to be processed by a plurality of operators, the operators processing at least a portion of the received data tuples;
establish an operator graph of the plurality of operators, the operator graph defining at least one execution path in which a first operator of the plurality of operators is configured to receive data tuples from at least one upstream operator and transmit data tuples to at least one downstream operator;
determine a current number of exceptions occurring while the upstream operator performs an operation based on at least one of the streaming data tuples; and
trigger a data window in at least one operator of the plurality of operators different from the upstream operator when the current number of exceptions satisfies a threshold, the data window comprising a plurality of data tuples, and wherein triggering the data window causes the at least one operator to evaluate the plurality of data tuples in the data window.

8. The computer program product of claim 7, wherein the threshold is a predefined threshold.

9. The computer program product of claim 7, further comprising computer-readable program code configured to:
determine a historical number of exceptions that are thrown from the upstream operator;
compare the historical number of exceptions to the current number of exceptions to determine whether the threshold is met; and
if the threshold is met, trigger the data window.

10. The computer program product of claim 7, wherein at least two upstream operators throw exceptions, further comprising computer-readable program code configured to:
measure the current number of exceptions for each of the at least two upstream operators; and
trigger the data window in the at least one operator based on the current number of exceptions for each of the at least two upstream operators.

11. The computer program product of claim 10, wherein triggering the data window is further based on whether the current number of exceptions for each of the at least two upstream operators exceed or fall below one or more thresholds, the one or more thresholds are based on one of:
a predefined threshold, and
a difference between at least one historical current number of exceptions and the current number of exceptions for each of the at least two upstream operators.

12. The computer program product of claim 7, wherein triggering the data window is based on an exception rate, the exception rate is a ratio of number of exceptions thrown by the upstream operator during a predefined period of time.

13. A system for processing data, comprising:
at least two compute nodes, each compute node comprising at least one computer processor, wherein the at least two compute nodes are configured to host at least one of a plurality of operators that process streaming data tuples, the operators processing at least a portion of the received data tuples,
wherein the plurality of operators establish an operator graph, the operator graph defining at least one execution path in which a first operator of the plurality of operators is configured to receive data tuples from at least one upstream operator and transmit data tuples to at least one downstream operator; and
a window activator that is configured to determine a current number of exceptions occurring while the upstream operator performs an operation based on at least one of the streaming data tuples and trigger a data window in at least one operator of the plurality of operators different from the upstream operator when the current number of exceptions satisfies a threshold, wherein the data window comprising a plurality of data tuples, and wherein triggering the data window causes the at least one operator to evaluate the plurality of data tuples in the data window.

14. The system of claim 13, wherein the threshold is a predefined threshold.

15. The system of claim 13, wherein the window activator is configured to:
determine a historical number of exceptions that are thrown from the upstream operator;
compare the historical number of exceptions to the current number of exceptions to determine whether the threshold is met; and
if the threshold is met, trigger the data window.

16. The system of claim 13, wherein at least two upstream operators throw exceptions, wherein the window activator is configured to:
measure the current number of exceptions for each of the at least two upstream operators; and
trigger the data window in the at least one operator based on the current number of exceptions for each of the at least two upstream operators.

17. The system of claim 16, wherein triggering the data window is further based on whether the current number of exceptions for each of the at least two upstream operators exceed or fall below one or more thresholds, the one or more thresholds are based on one of:
a predefined threshold, and
a difference between at least one historical current number of exceptions and the current number of exceptions for each of the at least two upstream operators.

* * * * *